No. 701,650. Patented June 3, 1902.
D. DE VULITCH & J. D'ORLOWSKY.
MANUFACTURE OF CALCIUM CARBID.
(Application filed Dec. 13, 1900.)
(No Model.) 3 Sheets—Sheet 1.
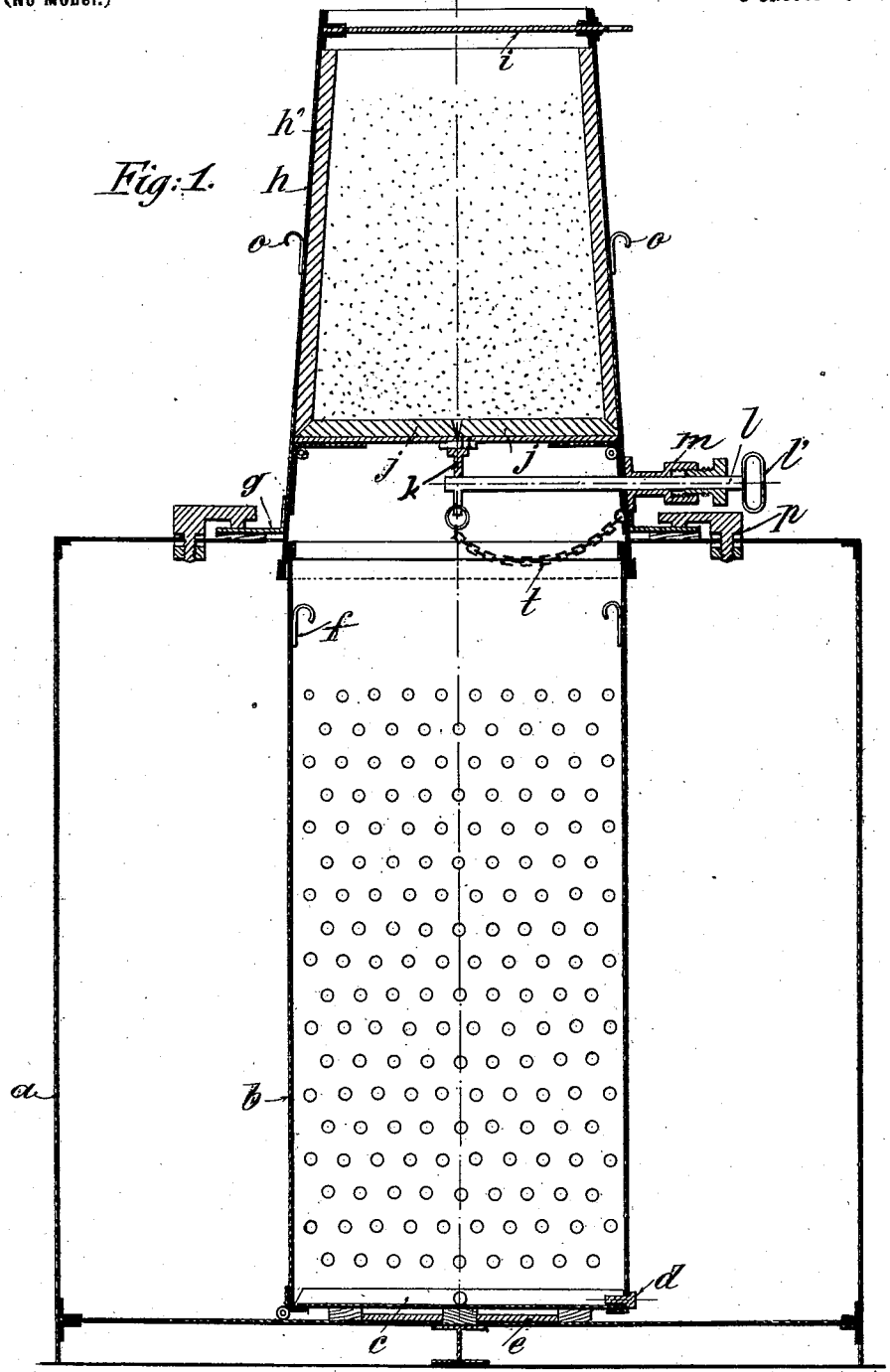

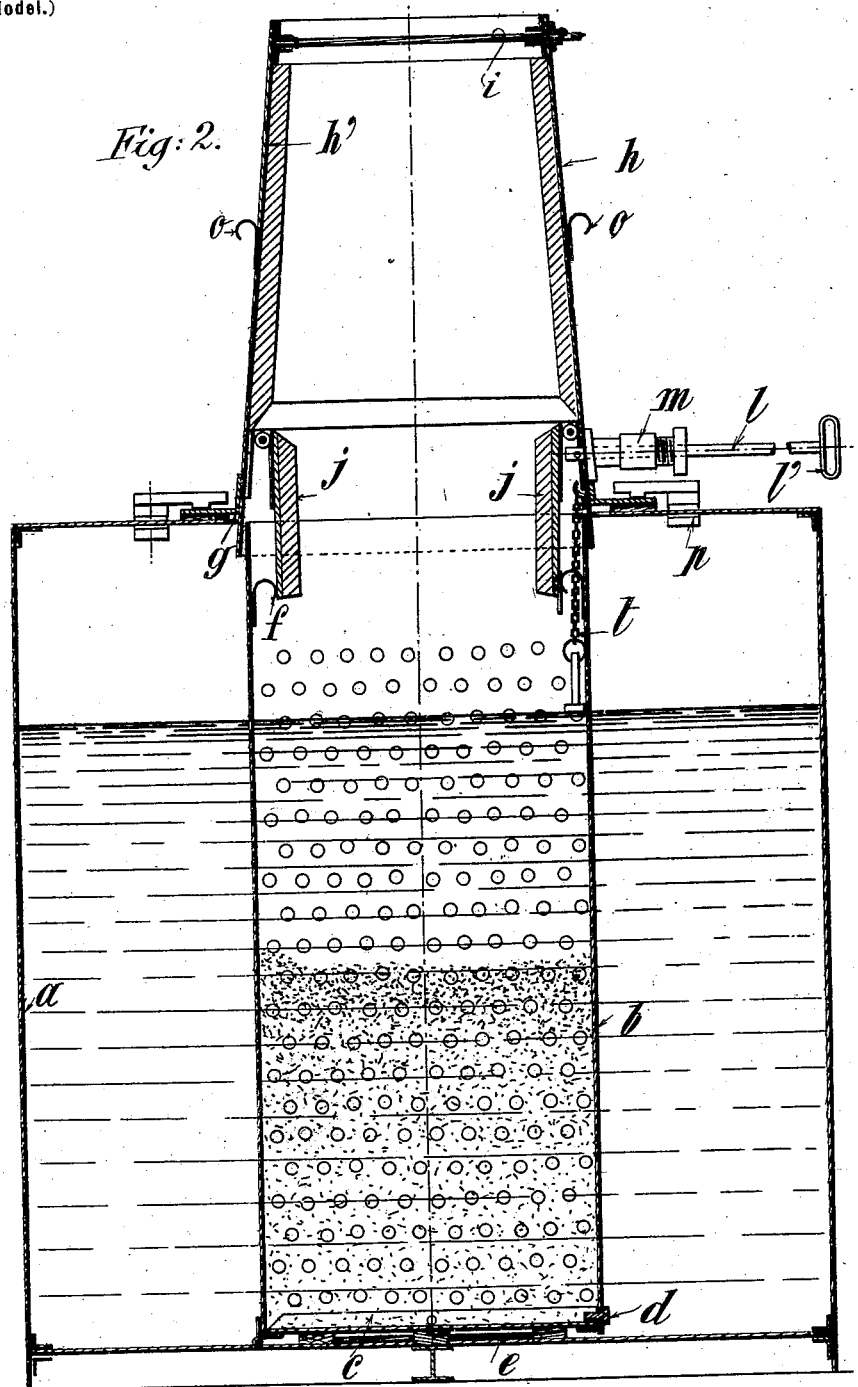

No. 701,650. Patented June 3, 1902.
D. DE VULITCH & J. D'ORLOWSKY.
MANUFACTURE OF CALCIUM CARBID.
(Application filed Dec. 13, 1900.)
(No Model.) 3 Sheets—Sheet 3.
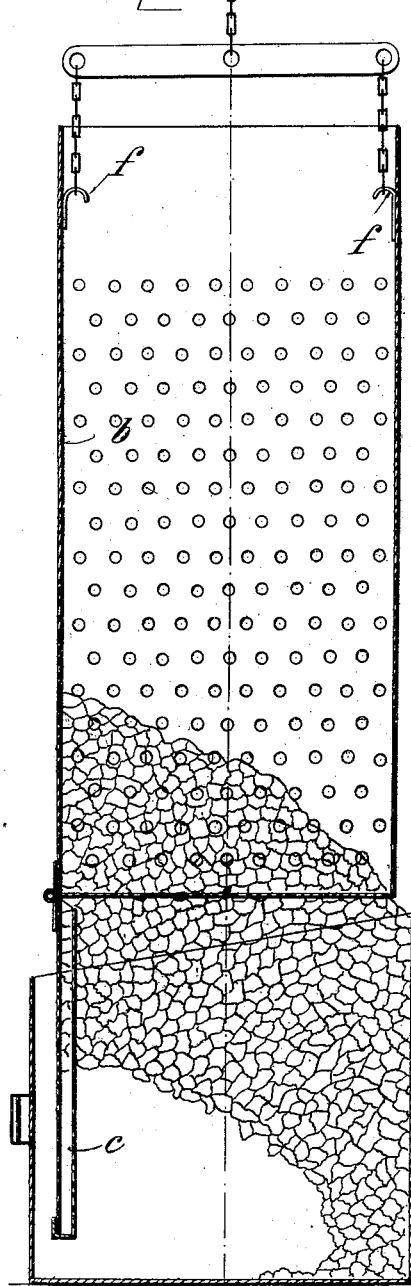
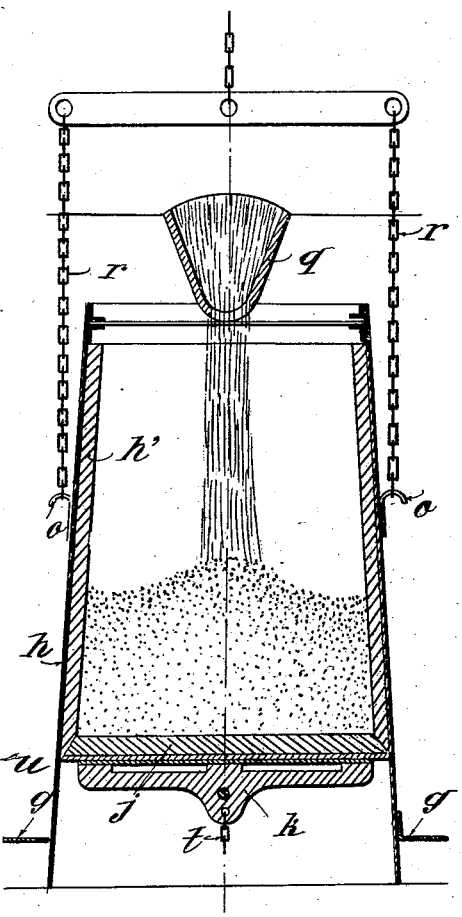

UNITED STATES PATENT OFFICE.

DOUSCHAN DE VULITCH AND JULES D'ORLOWSKY, OF PARIS, FRANCE.

MANUFACTURE OF CALCIUM CARBID.

SPECIFICATION forming part of Letters Patent No. 701,650, dated June 3, 1902.

Application filed December 13, 1900. Serial No. 39,697. (No specimens.)

*To all whom it may concern:*

Be it known that we, DOUSCHAN DE VULITCH, a citizen of the Republic of France, and JULES D'ORLOWSKY, a subject of the Czar of Russia, both residents of Paris, France, have invented a new and useful Improvement in Processes for the Manufacture of a Mixture of Calcium Carbid with Hydrocarbon, which improvement is fully set forth in the following specification.

This invention relates to a novel process for the manufacture of a mixture of calcium carbid with hydrocarbon, termed "carbonyt." For this purpose a quantity of lime is melted in an electric or other suitable furnace, or instead of employing lime a mixture of lime and carbon may be used. The mass obtained in either case after having been melted is run while protected from the air into an apparatus of any suitable kind containing a heavy hydrocarbon—such as "masud," (residue of petroleum distillation,) mineral or natural tar, resin, pitch, or the like, or a mixture of hydrocarbons. Owing to the high temperature of the mass when it leaves the furnace the calcium dissociates the hydrocarbon, the carbon becomes fixed upon the calcium, and there is thus produced by the fact of the immersion a certain quantity of calcium carbid which possesses very little compactness and which during cooling, when the crystals are formed, is completely penetrated by the hydrocarbon in which it is immersed. The calcium carbid of the new product is formed in the bath upon contact therewith of the molten lime. The product produced is impregnated throughout its mass with the hydrocarbon, which condition is due to the fact that the calcium carbid is itself formed in direct and intimate contact with the liquid hydrocarbon. It is obvious that whatever may be the quantity of lime contained in the mass immersed in the hydrocarbon-bath all this lime will be transformed into calcium carbid if the hydrocarbon is suitably selected. According as the quantity of lime is greater the hydrocarbon should be richer.

From the economic point of view our process as compared with the ordinary process for the manufacture of calcium carbid presents the advantage of utilizing low-priced hydrocarbons, such as those arising from the refining of petroleum, which have hitherto been but little used. The cost price of the carbid is therefore considerably diminished. Our process also presents the following advantages:

First. The calcium carbid obtained in the electric furnace always contains a certain proportion of phosphorous compounds, which render its manipulation dangerous. The immersion of the mixture of calcium carbid and lime in the hydrocarbon transforms these phosphorous compounds into other volatile compounds, which escape when the immersion takes place.

Second. The carbid obtained, which is intimately connected with the hydrocarbon, possesses properties which render it capable of manipulation without the least danger. In the first place, the hygrometric action of the air upon the carbid is *nil*, and in addition to this if it is removed from the water in which it has been immersed for the manufacture of acetylene all chemical action ceases immediately and the liberation of acetylene is arrested. This property is due to the fact that the carbid is impregnated throughout its mass and not merely upon its surface with the protective hydrocarbon. The value of this property in the employment of calcium carbid in appliances for the intermittent production of acetylene gas will be readily understood.

In order that our invention may be readily understood and carried into effect, we have represented in the accompanying drawings a constructional form of apparatus by means of which our process may be carried into practice.

Figure 1 is a vertical section showing the apparatus in the position which it occupies when it is upon the point of allowing the molten mass to flow into the hydrocarbon-bath. Fig. 2 is a vertical section through the same apparatus in the position which it occupies when the molten mass has been allowed to flow into the bath. Fig. 3 is a vertical section through the upper portion of the apparatus which receives the mass to be transformed either upon its leaving the electric furnace or otherwise. Fig. 4 represents the lower portion of the apparatus at the moment at which the calcium carbid obtained falls into a receiving vessel.

*a* is a vessel of any suitable form closed upon all sides, but provided at its upper portion only with an aperture through which is introduced into the vessel $a$ a perforated vessel $b$, provided with a bottom $c$, which is hinged and which opens when the three bolts $d$ are withdrawn, Figs. 1 and 2. The bottom of this vessel rests upon a base $e$. Within the vessel $b$ are provided two hooks $f$, from which chains are suspended, so as to permit of lifting the vessel $b$ out of the vessel $a$ and to again lower it into the same by means of suitable tackle.

To the vessel $b$ is hinged at $g$ another conical vessel $h$, provided above with a lid $i$, which may be opened or closed. The bottom of this vessel consists of two hinged traps $j$, opening downward. These traps are maintained closed by means of a support $k$ and of an operating rod or key $l$, adapted to be pushed through the support $k$ for the purpose of maintaining the bottom of the vessel $h$ closed. This operating rod or key $l$ is provided at one of its extremities with a handle $l'$ and passes through a stuffing-box $m$. The internal walls of the vessel $h$ are covered with plates of carbon $h'$ in order that the iron walls may not be attacked by the molten mass. This vessel may be raised and replaced at will. For this purpose it is provided externally with two hooks $o$, Figs. 1, 2, and 3, for attachment to the chains of an appropriate lifting-tackle. The bolts $p$ serve, on the one hand, to firmly maintain the vessel $h$ upon the vessel $a$ and also to hermetically assemble the two vessels.

The operation of the apparatus is as follows: The vessel $b$ is placed within the vessel $a$ and then three-fourths filled with the hydrocarbon necessary for carrying out the process. The vessel $h$, with its bottom closed, is then placed beneath the outlet-spout of the furnace, the chains $r$ are attached to the hooks $o$, and the tackle prepared for lifting the vessel. The cover $i$ is opened and also the doors of the furnace, the molten mass being allowed to flow into the receiving vessel. When this vessel is about seven-eighths filled, the lid is closed and the vessel $h$ removed from the vessel $a$. The four bolts $p$ are pushed forward and the operating rod or key $l$ withdrawn. At the same moment the support $k$ falls, but remains suspended from the chain $t$. The doors open, and the molten mass flows into the perforated vessel $b$, where it is submitted to the action of the hydrocarbon. This action continues for a few minutes at the most; but notwithstanding this the vessel $h$ should not be raised for half an hour or an hour in order to again fill it and place it upon another similar vessel $a$. If the vessel $b$ is lifted in order to be again employed, the aperture left free at the upper portion of the vessel $a$ is closed by means of an appropriate device and the fresh calcium carbid is not removed until it is sufficiently cooled, which may be ascertained by touching the external walls of the vessel $b$ with the hand. They should be sufficiently cool to enable the hand to be left in contact with them. When this temperature or a lower temperature is attained, the chains are suspended from the hooks of the tackle $r$, the vessel $b$ is lifted, and there is placed below it a vessel $u$ of any description, Fig. 4. The bolts $d$ are then withdrawn, the bottom $c$ opens, and the product falls into the vessel $u$. The bottom is then closed by means of the bolts $d$ and the vessel $b$ is replaced in a vessel $a$, where the operation may be recommenced.

What we claim, and desire to secure by Letters Patent of the United States, is—

The process herein described of making a mixture of calcium carbid and a hydrocarbon, which consists in bringing a mass of lime in a molten state free from carbon into intimate contact with a liquid hydrocarbon, and permitting the same to cool in contact therewith, substantially as set forth.

In testimony whereof we have signed this specification in the presence of two subscribing witnesses.

DOUSCHAN DE VULITCH.
JULES D'ORLOWSKY.

Witnesses:
EMILE LEIBRET,
EDWARD P. MACLEAN.